United States Patent
Perry et al.

[15] 3,663,069
[45] May 16, 1972

[54] SKID CONTROL SYSTEM

[72] Inventors: Charles C. Perry, Ann Arbor; Andre L. De Villiers, Whitmore Lake, both of Mich.

[73] Assignee: Kelsey-Hayes Company, Romulus, Mich.

[22] Filed: Oct. 7, 1970

[21] Appl. No.: 78,994

Related U.S. Application Data

[63] Continuation of Ser. No. 769,033, Oct. 21, 1968, abandoned.

[52] U.S. Cl. ............................................. 303/21 P, 303/20
[51] Int. Cl. ........................................................ B60t 8/08
[58] Field of Search ............... 188/181; 303/6, 20, 21, 61–63, 303/68–69

[56] References Cited

UNITED STATES PATENTS

| | | |
|---|---|---|
| 3,235,036 | 2/1966 | Meyer et al. ..................... 303/21 P X |
| 3,362,757 | 1/1968 | Marcheron .......................... 303/21 P |
| 3,433,536 | 3/1969 | Skinner .............................. 303/21 A |

Primary Examiner—Milton Buchler
Assistant Examiner—Stephen G. Kunin
Attorney—Harness, Dickey and Pierce

[57] ABSTRACT

A skid control system in which the retarding force on the vehicle is maximized as a function of one characteristic of the brake pressure and includes apparatus for sensing the magnitude and sign of the rate of change of the brake pressure.

16 Claims, 3 Drawing Figures

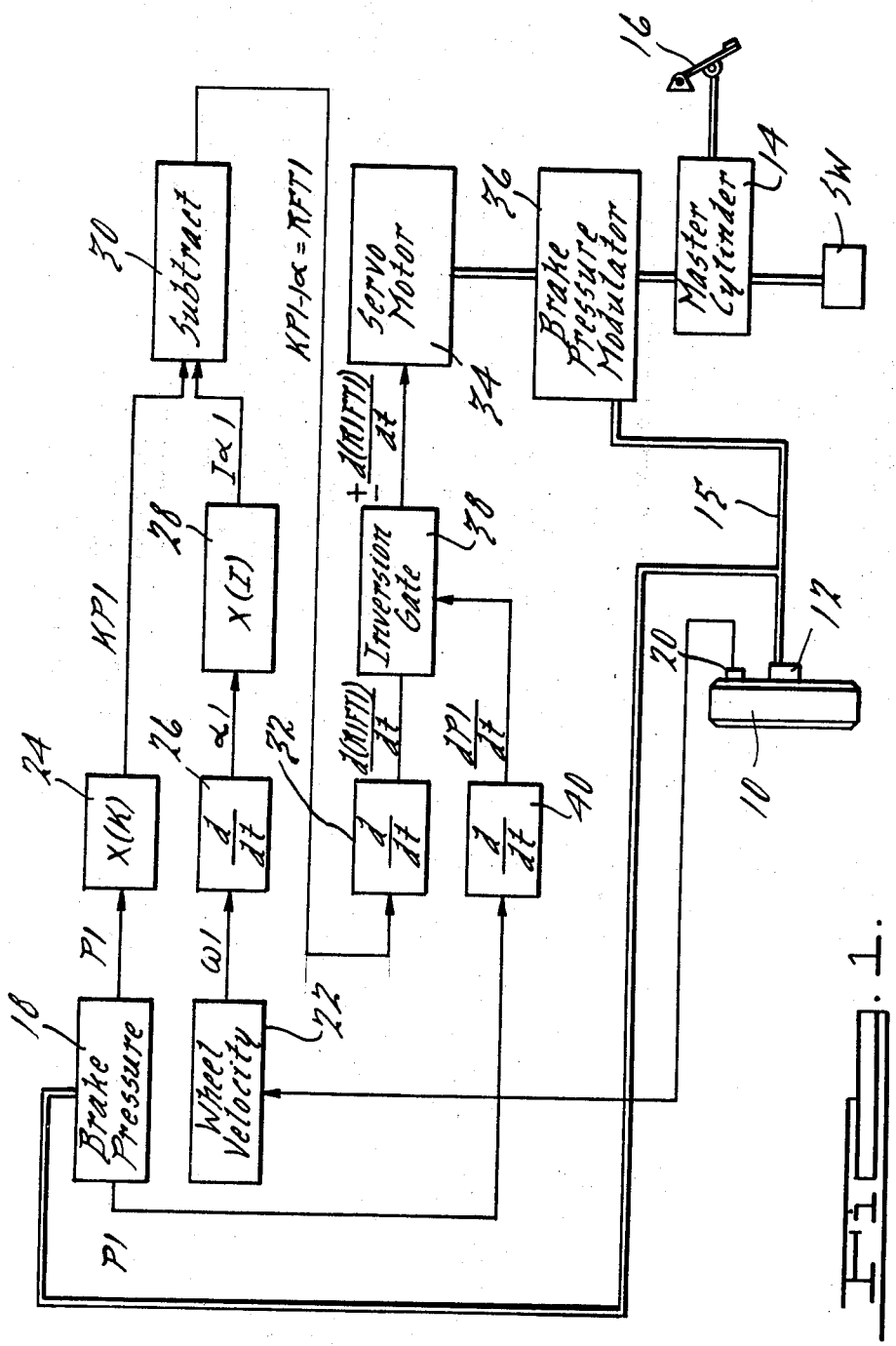

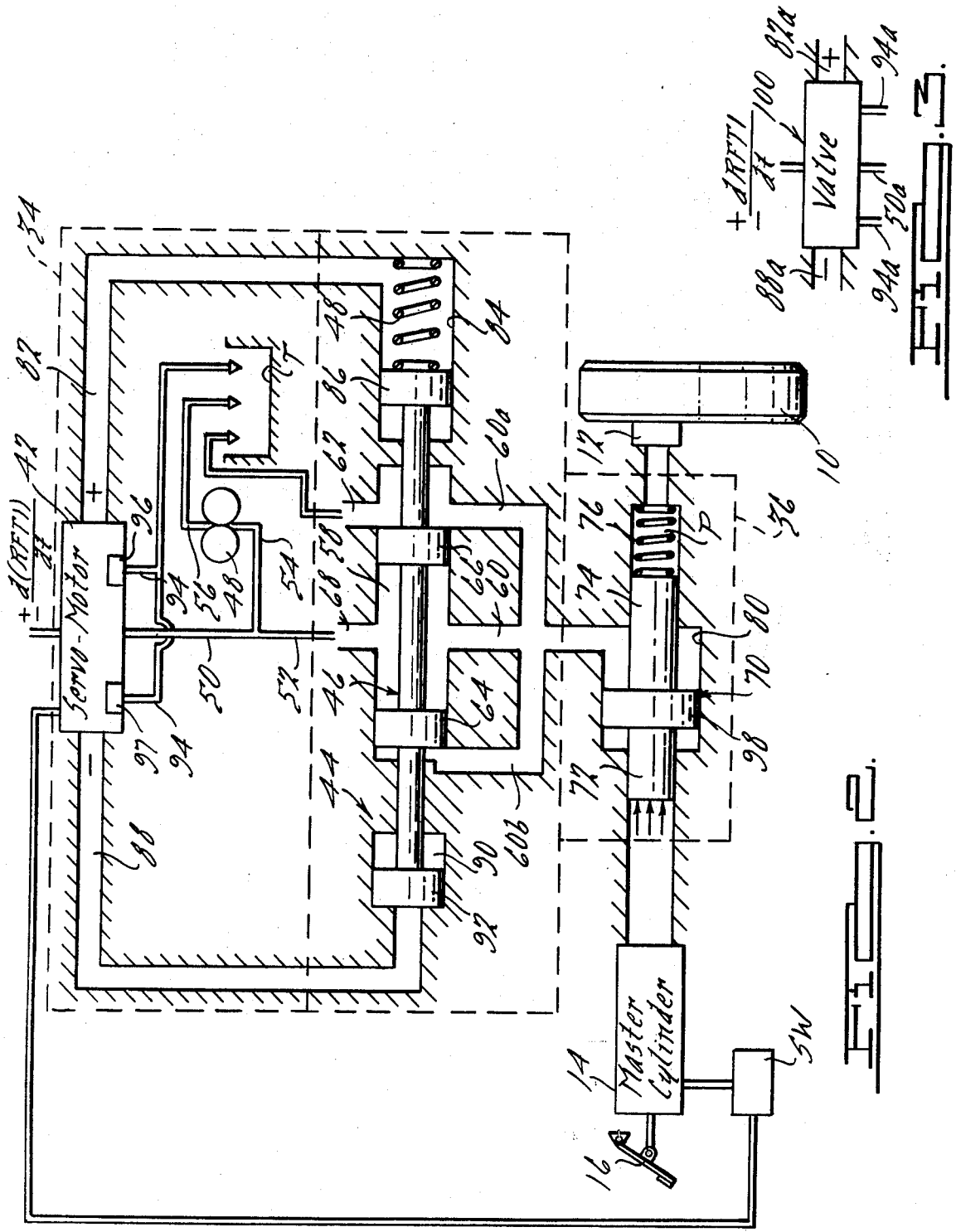

SKID CONTROL SYSTEM

This application is a continuation of Ser. No. 769,033 filed Oct. 21, 1968, and now abandoned.

SUMMARY BACKGROUND OF THE INVENTION

The present invention relates to vehicle braking systems and more particularly to a skid control system in which the retarding force is maximized as a function of the brake pressure.

In other skid control systems the braking effort is controlled as a function of vehicle wheel deceleration, vehicle deceleration, etc. These systems, in some cases, require relatively complex transducers such as accelerometers, etc. In the present invention braking effect can be maximized by measuring only two parameters, brake pressure and wheel deceleration, both of which are readily measured with simple transducers. Therefore, it is an object of the present invention to provide a novel and improved braking system.

It is another object of the present invention to provide a brake system which determines relative maxima of braking force as a function of brake pressure and provides braking about these points; it is another object to provide a brake system of the prior type in which retarding force is maximized as a function of brake pressure and wheel deceleration.

It is another object of the present invention to provide a skid control system of the above described type.

The present invention can be utilized to continuously modulate the brake pressure to maximize retarding force at a brake pressure as selected or applied by the vehicle operator; therefore, it is another object of the present invention to provide a braking system of the latter type.

Other objects, features, and advantages of the present invention will become apparent from the subsequent description and the appended claims, taken in conjunction with the accompanying drawings, in which:

FIG. 1 is a block diagram exemplifying the system of the present invention;

FIG. 2 is a diagrammatic representative of the modulating valve for use in the system of FIG. 1; and FIG. 3 is a partial diagrammatic representation of a modified form of system.

In considering a wheeled vehicle the brake torque equation for each braked wheel is the following:

$$T_B = I\alpha + u\,Fn\,R$$

For the above and subsequent equations the following symbols are used:

$T_B$ = Brake Torque
$u$ = Coefficient of friction between tire and road
$Fn$ = Normal force of tire on the road
$F_T$ = Tangential force between the tire and road
$R$ = Rolling radius of tire
$I$ = Moment of inertia of tire and wheel
$\alpha$ = Angular deceleration of tire
$P$ = Brake pressure
$W$ = Wheel velocity
$K$ = Constant (approximately for short time interval)

Assuming that brake torque, $T_B$, is proportional to brake pressure, $P$, then $KP = I\alpha + u\,Fn\,R$.

Note that $u\,Fn = F_T$, the tangential force between the tire and road, then, solving for $F_T$, $F_T = KP - I\alpha/R$ $F_T$, for all of the braked wheels, represents the retarding force on the vehicle. A skid control system which continuously maximized the retarding force, $F_T$, on all braked wheels of the vehicle will minimize the stopping distance for various situations, irrespective of tire, brake, or road conditions. Assuming that the rolling radius, $R$, is constant, it follows that $F_T$ can be evaluated continuously by measuring the brake pressure and the wheel deceleration. Then a servo-controlled pressure regulator or modulator in each brake line could be used to maximize $F_T$ throughout the stop.

In assuming proportionality between brake pressure, $P$, and brake torque, $T_B$, a constant coefficient of friction at the brake lining is presumed. The system performance will of course be affected by faded brakes which are characterized by a much lower coefficient of brake lining friction. However, since the proposed skid control system maximizes $F_T$ as a function of time during a stop, the absolute value of the retarding force is only incidental to the system operation except in terms of sensitivity and response. This is based on the presumed fact that the time constant characterizing brake fade is long with respect to the system time constant, (i.e., $K$ approximately constant and $dK/dt$ is negligible). It is evident that if the rolling radius, $R$, is sensibly constant, it does not matter whether $F_T$ or $R\,F_T$ is maximized.

Note that the equation $F_T = KP - I\alpha/R$ is true for a dynamically stable rolling wheel and is inapplicable to a locked wheel condition and hence applies to the stable portion of brake actuation. Note that the brake pressure $P$ is initially determined by the vehicle operator. If the magnitude of pressure is too high such as to tend to cause skidding (locked wheel) the instantaneous magnitude of $I\alpha$ will be very high and $F_T$ will not be at a maximum. Thus in the dynamic relationship noted above, the curve of $F_T$ versus $P$ would show initially an increase in $F_T$ with increases in $P$ until a maximum magnitude is reached after which further increases in $P$ result in a decrease in $F_T$. Assuming that $P$ is increased at a determined rate the magnitude of $F_T$ will vary with $P$ and will define then with time ($t$), a curve similar to the curve of $F_T$ vs. $P$. Since this curve of $F_T$ vs. $t$ defines determinable maxima, the relative maximum magnitude of $F_T$ can be found when $dF_T/dt = 0$. In the present invention the maximum magnitude of $F_T$ is determined by determining when the rate of change ($dF_T/dt$) of $F_T$ is at or near zero. The system of the present invention operates by supplying an error signal having a magnitude proportional to the magnitude $dF_T/dt$ to a servo motor controlling the pressure and/or the rate of change of pressure in the brake line (see FIG. 1). As noted, to maximize the retarding force the derivative $dF_T/dt$ is attempted to be held at or near zero. This is done by sensing the magnitude of $dF_T/dt$ and also by determining its sign. For increasing brake pressure if $dF_T/dt$ is positive it is approaching $dF_T/dt = 0$ and further increases in pressure should be permitted. If $dF_T/dt$ is negative it has passed through zero and the wheel is approaching skid (locked wheel) and further increases in pressure should be prevented and some pressure relief should be effected. For decreasing brake pressure when $dF_T/dt$ is positive it indicates that $F_T$ has crossed over the $dF_T/dt = 0$ or $F_T$ = maximum point and is returning towards $dF_T/dt = 0$ and further reductions in brake pressure are in order. When $dF_T/dt$ is negative it indicates that $F_T$ has returned over the $dF_T/dt = 0$ and is moving away from $dF_T/dt = 0$ and an increase in brake pressure is in order. In the system then of the present invention the retarding force $F_T$ is maximized by applying or reducing brake pressure in accordance with the magnitude of $dF_T/dt$ and with the need for application or reduction in brake pressure being determined from the sign of $dF_T/dt$ and $dP/dt$.

Looking now to FIG. 1, the brake pressure signal $P1$ is multiplied by the factor $K$ by multiplier 24 to provide the term $KP1$ for the equation for $F_T$. At the same time the wheel velocity signal $w1$ from the sensor circuit 22 is differentiated in differentiating circuit 26 to provide the angular acceleration term $\alpha 1$. This signal is in turn multiplied by the constant $I$ (representative of the moment of inertia of the wheel) in multiplier 28 to provide the term $I\alpha 1$. In accordance with the equation for $F_T$ the term $I\alpha 1$ is subtracted from the term $KP1$ in the difference section 30 to provide a signal $RF_T1$ which is representative of the tangential force $F_T$ multiplied by a constant representative of rolling radius $R$. The signal $RF_T1$ is then differentiated in differentiating circuit 32 to provide the derivative of the tangential force $F_T$ in the form of the signal $dRF_T1/dt$. As noted, to maximize retarding force $F_T$ the system attempts to maintain the derivative $dRF_T1/dt$ at zero, i.e., $F_T$ is maximum. In one form of the invention this is done by varying the brake pressure $P$ in accordance with the magnitude of the derivative $dRF_T1/dt$. This is accomplished by the servo motor and valve section 34 as it operates on the brake pressure modulation section 36 which in turn acts on the master cylinder 14. As will be seen the servo section 34 and modulator section 36 are actuable to either increase or decrease brake pressure P as required. While the magnitude of the derivative $dRF_T1/dt$ will determine the degree of correction for brake pressure P, the sign of that derivative alone will not provide an indication of whether the correction should be to increase or decrease brake pressure P. As can be seen from the prior discussion, the direction of correction in brake pressure is dependent not only on the sign of the derivative $dRF_T1/dt$ but also on the sign of the derivative $dP1/dt$ of brake pressure P. Thus, as noted, when $dRF_T1/dt$ approaches zero with $F_T$ increasing its sign is positive. But $F_T$ can be increasing either as the result of increasing or decreasing pressure P. If the force derivative is positive for increasing pressure ($dP1/dt$ is positive) then further pressure increases should be made. If it is positive for decreasing pressure ($dP1/dt$ is negative), then further pressure decreases should be made. Thus the sign of both derivatives will determine the type of corrective action to be taken. When $dRF_T1/dt$ is negative it indicates that $F_T$ is decreasing which can also occur either as the result of increasing or decreasing pressure P. If the pressure is increasing ($dP1/dt$ is positive), then pressure reduction should be made. If the pressure is decreasing ($dP1/dt$ is negative), then a pressure increase should be made. The servo motor section 34 will operate in accordance with both the magnitude and sign of the signal $dRF_T1/dt$. When the sign is positive the sections 34 and 36 will act to increase brake pressure in accordance with the magnitude of the derivative. When the sign is negative the sections 34 and 36 will act to decrease brake pressure in accordance with the magnitude of the derivative. However, as noted, the sign of the derivative must be determined both by the sign of the derivative signal $dRF_T1/dt$ out from section 32 and by the sign of the derivative $dP1/dt$ of the pressure signal out from section 18. An inversion gate section 38 acts on the signal out from section 32 in accordance with the sign of that signal and also in accordance with the sign of the derivative signal $dP1/dt$ from differentiating section 40 to provide the derivative signal $dRF_T1/dt$ with the proper sign. The section 40 differentiates the signal P1 out from section 18. In FIG. 1 a braked wheel 10 has its brake wheel cylinder 12 controlled by a master cylinder 14 via fluid line 15 which in turn is actuated by the vehicle operator via a brake pedal and linkage 16. A pressure transducer 18 is connected to fluid line 15 and senses the fluid pressure to wheel cylinder 12 and provides an electrical output signal P1 which varies magnitude in the same manner as the brake pressure P and hence provides an electrical indication of the magnitude of P. An electrical pick-up 20 provides a signal to the wheel velocity sensor 22 which in turn provides an output signal $w1$ which is proportional to wheel velocity $w$. The inversion gate section 38 inverts or reverses the sign of the error signal when $dP1/dt$ is negative. The reason for this is evident from the following table which shows the required sign of $dP1/dt$ (and, therefore of the error signal) for every combination of initial signs of $dP1/dt$ and $dF_T1/dt$ or $d(RF_T1)/t$.

| | Initial Condition | | Required for Correction |
|---|---|---|---|
| $dP1/dt$ | $dF_T1/dt$ | $dP1/dt$ | $dF_T1/dt$ (error signal) |
| 1  +  | +  | +  | + |
| 2  +  | 0  |   | 0   0 |
| 3  −  | 0  | 0 | 0 |
| 4  +  | −  | − | − |
| 5  −  | −  | + | + |
| 6  −  | +  | − | − |
| 7  0  | +  | + | + |
| 8  0  | −  | − | − |

It can be seen from the table that inversion of the error signal is required only for cases 5 and 6 when $dP1/dt$ is negative. Case 3 is of no significance, since the error signal is zero. This function is performed by the inversion gate section 38.

One form of brake pressure modulator suitable for this skid control system is shown diagrammatically (without seals, vents, etc.) in FIG. 2. Referring to the figure, the servo motor section 34 is energized through the stop light switch SW. In the unenergized state, a servo motor valve 42 is in its neutral position. At the same time in the modulator section 36 a control valve 44 has a spool 46 biased to the left by a spring 48 at its right hand end. A pump 48 provides fluid pressure to output lines 50 and 52 via outlet line 54. The pump 48 has a return line 56 connected to tank T. The outlet line 50 is connected to servo motor 42 while outlet line 52 is connected to an inlet chamber 58 of valve 44. Chamber 58 has an outlet line 60 and a return line 62 which is connected to tank T. The spool 46 has lands 64 and 66 located on opposite sides of inlet 68 which is connected to outlet line 52. The land 66 is proximate to return line 62. Outlet lines 60a and 60b are connected from outlet line 60 to opposite ends of lands 64 and 66. In the position shown, fluid is freely circulated from pump 48 to tank T via line 60a to the right hand portion of chamber 58 and line 62; hence little pressure will be developed at output line 60; note that the pressure on spool 46 is balanced by equal pressure on both sides of lands 64 and 66. The master cylinder 14 operates through a modulating floating piston 70 to apply pressure to wheel cylinder 12. Thus piston 70 has one rod portion 72 connected to master cylinder 14 and an opposite rod portion 74 connected to line 15 to wheel cylinder 12. A spring 76 normally biases the floating piston 70 to its deactuated position as shown. Upon actuation of master cylinder 14 via pedal 16 pressurized fluid from master cylinder 14 moves the floating piston 70 to the right to energize the wheel cylinder 12. The piston 70 has a head portion 98 located in a cylinder 80 with the end of the cylinder 80 receiving rod portion 74 being connected to outlet line 60. Thus fluid pressure in line 60 will affect the position of floating piston 70 and hence will affect the pressure P to wheel cylinder 12. In the deactuated condition of servo-motor valve 42 and with spool 46 in the position shown minimum pressure will be developed in cylinder 80 and hence the position of piston 72 and pressure P will be determined solely by actuation of the vehicle operator. The position of servo-motor valve 42 (when energized) will be determined by the magnitude of the error signal $dR F_T1/dt$. The servo valve 42 is a flow control valve and its flow rate is proportional to its position and hence to the magnitude of the error signal. For a positive error signal servo 42 will be actuated to provide flow to the right side of valve spool 46 and for a negative error signal servo 42 will be actuated to provide flow to the left side of valve spool 46. Thus servo 42 has one control line 82 connected to a chamber 84 with the flow in line 82 acting on a land 86 of spool 46 which is supported on chamber 84. The flow in chamber 84 will urge the spool 46 to the left. Spring 48 is also located in chamber 84 to act on land 86 to urge spool 46 to the left. Servo 42 has a second control line 88 connected to a chamber 90 with the flow in line 88 acting on a land 92 of spool 46 which is supported in chamber 90 to urge the spool 46 to the right.

To provide continuous modulation of brake pressure P the servo 42 is designed to have a position proportional to the magnitude of and in the direction of the sign of the error signal $dR F_T1/dt$. Thus for a negative error signal the line 88 will have flow proportional to the magnitude of the error signal and for a positive error signal line 82 will have flow similarly proportional. Assuming a brake application and the occurrence of a skid condition line 88 will be subject to flow and spool 46 will be moved to the right against spring 48 at a rate proportional to the flow rate in line 88. This in turn will move land 66 towards positions partially blocking or restricting passages 60a and 62. This will result in an increase in pressure in chamber 58 and hence in cylinder 80 which will result in a force on piston 70 acting to relieve pressure P. This latter force will vary with size of the restriction and will vary at a rate proportional to the magnitude of the error signal. When the error signal is positive, flow is caused in line 82 to move spool 46 towards the left to decrease pressure on piston 70.

More specifically now, when the brake pedal 16 is applied pressure is transmitted through the floating piston 70 to the wheel cylinder 12 causing the brake pressure and the retarding force to rise. At the same time the servo-motor 42 is actuatable since switch SW is now closed. Since the servo-motor is energized it now senses a positive error signal as a result of the rising retarding force and directs fluid to the chamber 84 and on land 86 of spool 46 tending to move spool 46 to the left. However, the valve spool 46 was initially biased to its leftmost position by the spring 48 and the output of servo-valve 42 is dumped to tank T via line 94 via a relief valve 96. Thus, under these conditions, which represent either a normal stop or the first phase of a panic stop, the brake or skid control system has no effect. A similar relief valve 98 dumps pressure to tank T at a selected high pressure when opposite line 88 is pressurized for negative error signals; in this condition fluid flow acting on land 92 moves spool 46 to the right. When and if the error signal ever becomes negative, the skid control system becomes effective and continually modulates the brake pressure $P$ as necessary to maximize the retard-force $F_T$ up to the limit corresponding to the applied force at brake pedal 16. That is, the skid control system, once operative, will thereafter vary the brake pressure $P$ upward and downward so as to maximize the retarding force $F_T$ but will not produce a brake pressure $P$ in excess of the master cylinder pressure. The time constant of the skid control system is selected to be small with respect to the time required to lock up a wheel.

In the system shown and described the brake pressure is being continuously modulated in accordance with the magnitude of the error signal. The system could be modified to provide "on" or "off" operation whereby a constant flow is provided from the control valve 44 to provide control pressure to the floating piston 70. This can be accomplished by substituting a two-position valve for the servo-valve 42. In FIG. 3 components similar to like components in FIG. 2 have been given the same numerical designation with the addition of the postscript "$a$." Thus in FIG. 3 a two-position valve 100 has outlet lines 82$a$ and 88$a$ and is responsive to the error signal $dR\ F_T1/dt$ attaining a selected magnitude whereby the valve 100 will be positioned to energize fluid line 88$a$ for a negative error signal and fluid line 82$a$ for a positive error signal. This will result in an "on" and "off" type operation in which the brake pressure $P$ will alternately be relieved and reapplied to provide control. The remainder of the structure is similar to that shown in FIG. 2.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. In a skid control system for controlling fluid pressure actuated brakes of at least one wheel of a wheeled vehicle by controlling the fluid pressure to the brakes, said system comprising:

brake pressure transducer means for providing an indication of the magnitude of brake pressure and an indication of the sign of the rate of change of brake pressure, first means responsive to said indication of the magnitude of brake pressure for providing an indication of the magnitude of the retarding force on at least said one wheel, and second means for varying the magnitude of the fluid pressure to the brakes for said at least one wheel as a function of variations of said indication of the magnitude of the retarding force and the direction of variance as a function of said indication of the sign of the rate of change of brake pressure.

2. The system of claim 1 wherein said first means includes means for providing an indication of the deceleration of the wheel and said first means providing the indication of the magnitude of said retarding force as a function of said indication of the magnitude of the brake pressure and of said deceleration.

3. The system of claim 1 with said second means varying the change in magnitude of the fluid pressure to the brakes as a function of the rate of change of said indication of the retarding force.

4. The system of claim 3 with said second means including control means operative in response to a control signal for controlling the fluid pressure to the brakes, said second means including signal means for providing said control signal having a magnitude representative of the magnitude of the rate of change of said indication of the retarding force.

5. The system of claim 4 with said control means relieving the fluid pressure when said control signal has one sign and for reapplying the fluid pressure when said control signal has the opposite sign.

6. The system of claim 5 with the sign of said control signal being determined by the sign of the rate of change of said indication of the retarding force and by the sign of the rate of change of the brake pressure.

7. The system of claim 6 with the sign of said control signal normally being determined by the sign of the rate of change of said indication and with said second means providing a sign to said control signal opposite to that as determined by said indication in response to the sign of the rate of change of the brake pressure being of a selected polarity.

8. The system of claim 7 with said selected polarity being negative.

9. The system of claim 7 with said control means varying the magnitude of the brake pressure in accordance with variations in the magnitude of said control signal.

10. The system of claim 7 with said control means controlling the brake pressure in response to the magnitude of said control signal attaining a determinable magnitude.

11. The system of claim 10 with said control means relieving the brake pressure a preselected amount in response to said control signal attaining said determinable magnitude.

12. The system of claim 1 with said second means comprising flow control means for providing fluid flow at a rate varying in magnitude in accordance with variations in the magnitude of the rate of change of the retarding force, and control valve means responsive to the flow from said flow control means for varying the magnitude of the brake pressure at a rate corresponding to flow rate.

13. The system of claim 12 with said control valve means comprising a spool valve movable at a rate corresponding to flow rate.

14. The system of claim 1 with said second means comprising flow means for providing fluid flow at a preselected rate in one direction in response to the occurrence of the rate of change of the retarding force having a preselected magnitude and with the rate of change of the retarding force and of the brake pressure having determinable first signs and for providing fluid flow at a preselected rate in the other direction in response to the occurrence of the rate of change of the retarding force having a preselected magnitude and with the rate of change of the retarding force and of the brake pressure having determinable second signs.

15. The system of claim 14 with said preselected rate of fluid flow being generally fixed.

16. The system of claim 14 with said preselected rate of fluid flow varying in magnitude in accordance with variations in magnitude of the rate of change of the retarding force.

* * * * *